Oct. 19, 1971 P. BAUMGARTL 3,613,474
TRANSMISSION RATIO CONTROL LINKAGE MECHANISM
Filed July 17, 1970

Paul Baumgartl
INVENTOR.
BY
ATTORNEYS.

Oct. 19, 1971  P. BAUMGARTL  3,613,474
TRANSMISSION RATIO CONTROL LINKAGE MECHANISM
Filed July 17, 1970  2 Sheets-Sheet 2
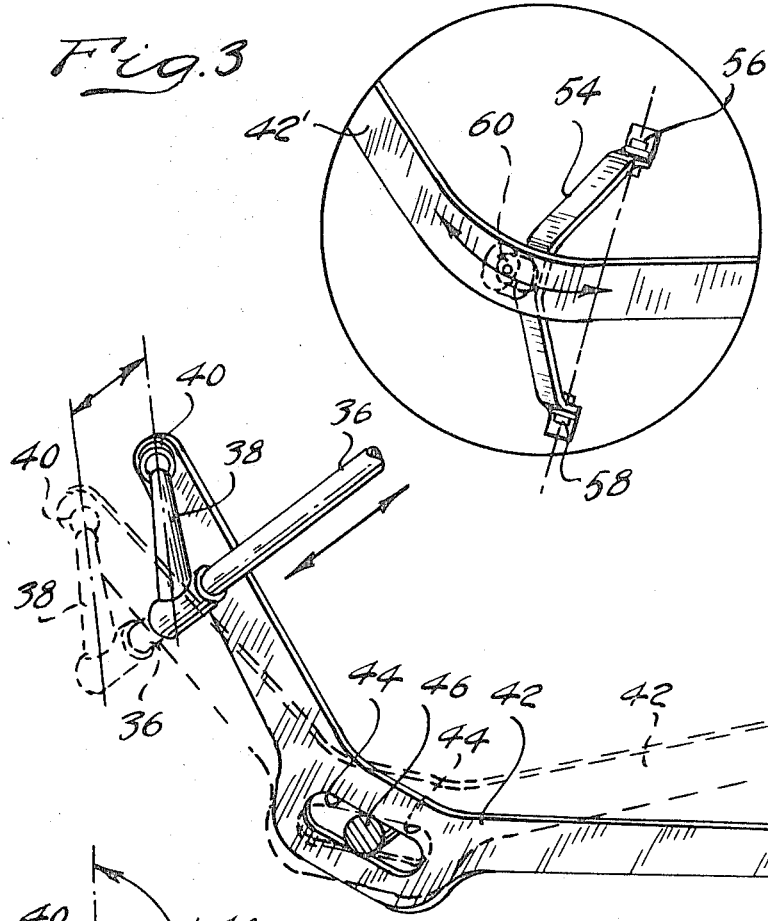
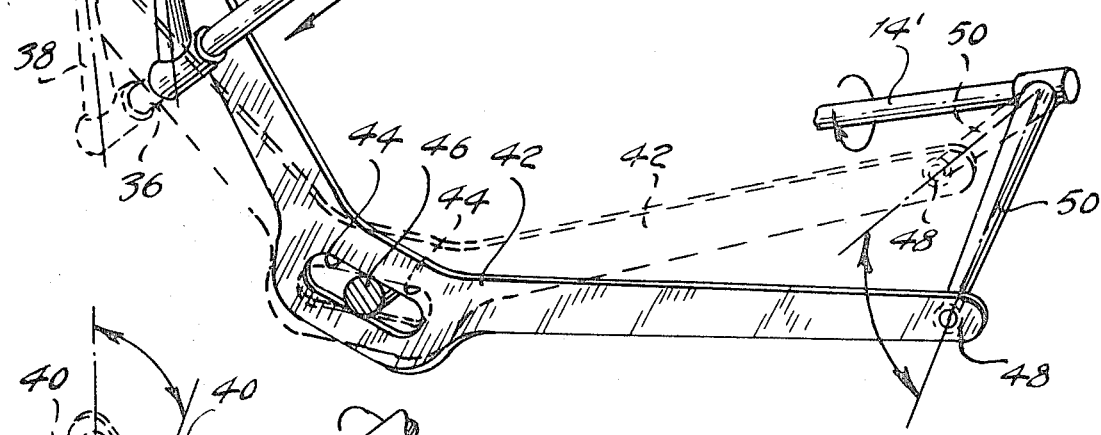
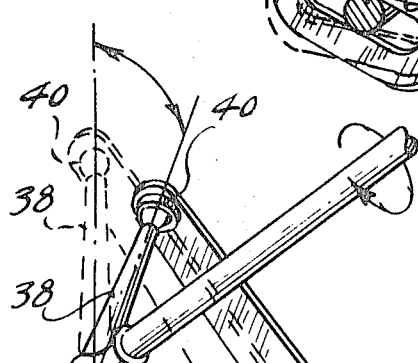
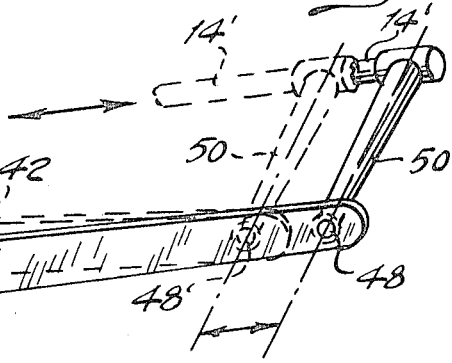
Paul Baumgartl
INVENTOR.
BY
ATTORNEYS.

United States Patent Office 3,613,474
Patented Oct. 19, 1971

1

3,613,474
TRANSMISSION RATIO CONTROL LINKAGE
MECHANISM
Paul Baumgartl, Sao Paulo, Brazil, assignor to Ford
Motor Company, Dearborn, Mich.
Filed July 17, 1970, Ser. No. 55,802
Int. Cl. G05g 9/18
U.S. Cl. 74—484
8 Claims

ABSTRACT OF THE DISCLOSURE

A transmission ratio control linkage mechanism for an automotive vehicle comprising a gearshift lever mounted for rotation and for reciprocation on the vehicle's steering column, a control lever mounted for oscillation about a movable axis whereby angular motion as well as translatory motion is permitted, a motion transmitting connection between the gearshift lever and one end of the control lever and another motion transmitting connection between the other end of said control lever and a ratio controlling element of the transmission mechanism.

GENERAL DESCRIPTION OF THE INVENTION

This invention may be used to obtain ratio changes in a manually controlled transmission mechanism for an automotive vehicle. It is adapted especially to be used to effect ratio changes for a manual transmission in which the torque transmitting elements are controlled during ratio changes by a shift rail adapted to be moved in a direction parallel to the direction of the transmission output shaft with both a reciprocating and rotary motion. The rotary motion of the shift rail occurs during gear ratio selection and reciprocating motion of the shift rail occurs during ratio changes.

I am aware of various transmission gearshift linkage mechanisms capable of establishing appropriate rotary and shifting movement of a single shift rail for a manually controlled transmission. These linkage mechanisms are used, however, on so-called floor-mounted gearshift installations in which a drive controlled gearshift lever is pivoted on a gearshift tower structure mounted on the upper side of the transmission housing, which usually is located below the floor plan structure of the vehicle passenger compartment.

Gearshift linkage mechanisms for single rail transmissions of this type have not been used heretofore with a cane type gearshift linkage elements mounted on the vehicle steering column because of the complex leverage system that would be required to transmit the compound motion of the driver-controlled gearshift lever to the movable transmission shift rail.

Special performance considerations arise with such an installation because it is necessary to translate rotary motion of the gearshift lever into reciprocating motion of the shift rail at the transmission and to transmit linear motion of the gearshift lever into rotary motion of the transmission shift rail.

There occurs, therefore, a double inversion of the compound motion of the gearshift lever by the operator as ratio controlling motions are transmitted through the mechanism to the transmission shift rail. My improved

2 gearshift mechanism is capable of achieving double inversion of the compound motion of the gearshift lever.

BRIEF DESCRIPTION OF THE FIGURES OF THE DRAWING

FIG. 3 is an alternate construction for mounting the motion inverting lever of FIG. 2 to provide a moving axis of oscillation.

FIG. 4 is a partial assembly view showing the motion pattern for the motion inverting lever of FIG. 2 when the gearshift lever is moved with a linear motion.

FIG. 5 is a partial assembly view showing the pattern of movement of the motion inverting lever of FIG. 2 when the driver controlled gearshift lever mechanism is moved angularly.

PARTICULAR DESCRIPTION OF THE INVENTION

Figure 1:
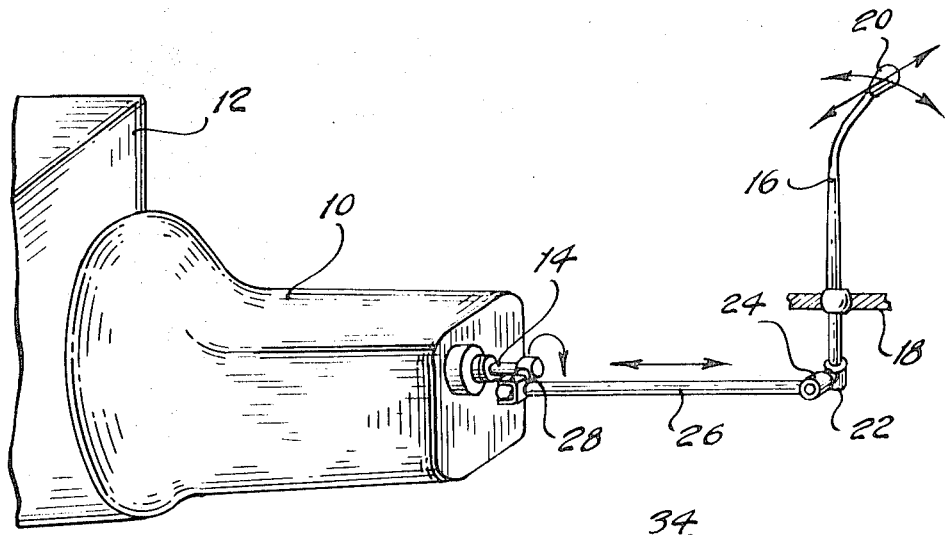
FIG. 1 shows in outline form a transmission having a single shift rail and a conventional floor mounted gearshift linkage mechanism for shifting the shift rail with both a linear motion and a rotary motion.

FIG. 1 shows a known form of gearshift linkage mechanism for effecting ratio change in a conventional manual transmission, the latter being designated generally by reference character 10. The transmission is mounted in the usual fashion on the engine block 12 for an internal combustion engine. The shift rail 14 is supported within the housing for the transmission 10 and is adapted to move in a direction parallel to the direction of the output axis for the transmission.

A gearshift lever 16 in the form of a cane is mounted for universal movement on a pivot support 18 carried by the vehicle floor pan structure. The upper end 20 of the lever 16 is moved by both a fore-and-aft motion and a rotary motion thereby effecting a compound motion of the lower end 22.

A motion transmitting linkage 24 connects the end 22 with one end of shaft lever 26. A similar link 28 connects the other end of the shaft 26 to the extended end of the shift rail 14. Movement of the end 20 in a transverse direction accomplishes rotary motion of the link 24 about the pivot support 18. This effects corresponding rotary motion of the link 28 thereby causing rotary motion of the shift rail 14. Movement of the end 20 in a fore-and-aft direction will effect reciprocation of the shift rail 14.

Figure 2:
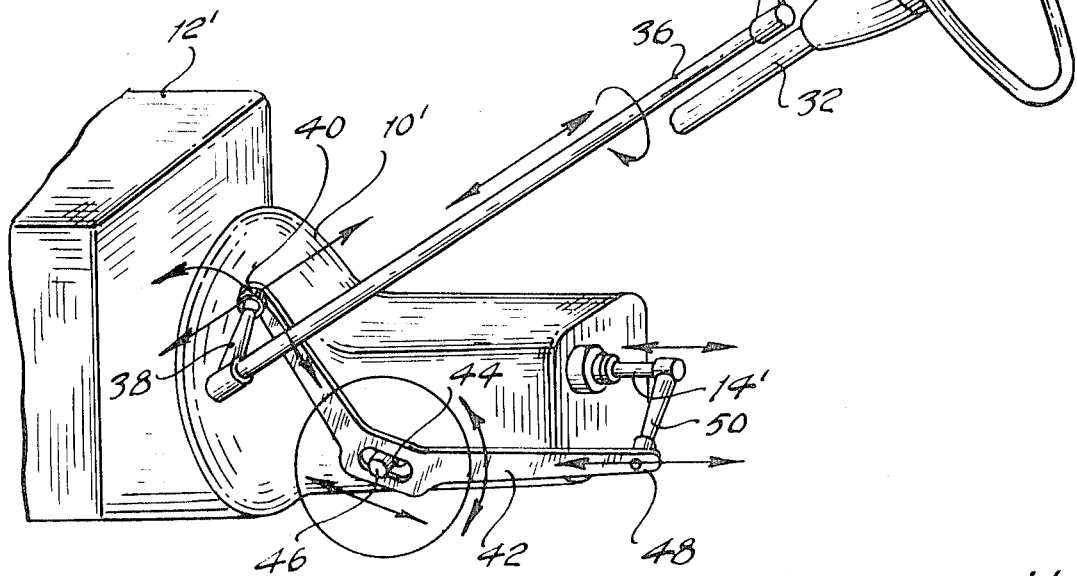
FIG. 2 is an assembly drawing partly in schematic form showing my improved gearshift linkage mechanism having driver controlled elements mounted on the steering column within the vehicle passenger compartment.

The improvements of my invention make it possible to achieve the rotary and reciprocating motion for the shift rail 14 by using a steering column mounted gearshift lever which is indicated in FIG. 2 by reference character 30. Lever 30 extends radially outwardly from the steering column structure 32 and is adapted to rotate about its radially innermost end as the outermost end of the lever 30 moves through an arc 34. The lever 30 is connected at its innermost end to shift 36 mounted in parallel disposition with respect to the column 32. The lowermost end of shaft 36 is connected to arm 38, which extends radially outwardly. Its outermost end is pivoted at 40 to one end of lever 42. An intermediate portion of the lever 42 is provided with a slot 44 through which extends a pivot pin 46. The pivot pin 46 serves to support the lever 42 for oscillation, although the slot 44 will permit linear adjustment of the lever with respect to the pin. The other end 48 of the lever 42 is connected to the radially outward end of shaft 50 which is secured to the extended end of shift rail 14' of the transmission 10'. The rail 14', transmission 10' and the engine 12' correspond respectively to the rail 14, transmission 10 and the engine 12 of FIG. 1.

The connection between the arm 38 and the lever 42 is preferably a universal motion connection which may comprise a ball and socket arrangement that will permit angular adjustments of arm 38 in any direction with respect to the plane of oscillation of the lever 42. A similar universal connection is provided also between the arm 50 and the other end of the lever 42.

The gearshift lever 30 may be moved linearly as indicated by the directional arrows 52. This causes shaft 36 and arm 38 to transmit rotary motion to the end 40 of lever 42 thereby causing lever 42 to pivot about the pivot end 46. The other end 48 of the lever 42 then causes arm 50 and shift rail 14 to rotate about the axis of the shift rail 14. Gear ratio selections are made in this manner.

When the gearshift lever 30 is rotated about the axis of the shaft 36, linear motion is imparted to lever 42. This causes the pin 46 to move within its slot 44. As the end 48 of the lever 42 moves in the direction of the axis of the shift rail 14', shift rail 14' is adjusted linearly in this fashion thereby accomplishing gear or synchronizer clutch engagement in the transmission following the gear ratio selection.

It is apparent from the foregoing and from the illustrations in FIGS. 4 and 5 that a linear motion of the shift lever 30 will impart a rotary motion to the shift rail 14' and a rotary motion of the shift lever 30 will impart a linear motion to the shift rail 14'. In FIG. 4 the linear motion of the gearshift lever 30 will impart a linear motion to the shaft 36 thereby causing the lever 42 to move from one dotted line position to the other. This imparts a rotary motion to the arm 50 thus causing the arm 50 to rotate about the axis of the shift rail 14'. Conversely, as seen in FIG. 5, rotary motion of the shaft 36 will cause linear displacement of the lever 42 from one of the dotted line positions to the other. This is accompanied by a sliding movement of the pivot pin 42 within the slot 44. This linear motion of the lever 42 imparts a linear motion to the shift rail 14.

In FIG. 3 I have illustrated an alternate means for mounting the motion inverting lever. In the embodiment of FIG. 3 the motion inverting lever is designated by reference character 42'. A pivot bracket 54 is pinned at 56 and 58 to a fixed portion of the exterior of the transmission 10. The center portion of the pivot bracket 54 is displaced from the axis of oscillation and is connected through universal connection 60 to the central region of the motion inverting lever 42'. The axis of oscillation of the pivot bracket 54 is transversely situated with respect to the direction of linear displacement of the lever 42' and is arranged in spaced, parallel disposition with respect to the plane of motion of the lever 42'. The pivot bracket 54 will accommodate linear displacement of the lever 42' when the gearshift lever 30 is moved angularly.

Having thus described a preferred form of my invention, what I claim and desire to secure by U.S. Letters Patent is:

1. In combination, a gearshift linkage mechanism for imparting a compound motion to a shift rail and a manually-controlled, multiple-ratio power transmission mechanism, said shift rail being adapted to move linearly in the direction of its axis during engagement and disengagement of torque delivery elements of said transmission and being adapted to be rotated about its axis during gear ratio selection, said mechanism comprising a gearshift lever, a motion transmitting shaft connected to one end of said lever, said shaft being mounted for reciprocation in the direction of its axis and for rotation about its axis, a motion inverting lever, means for mounting said motion inverting lever pivotally on said transmission, means for pivotally connecting said shaft to one end of said motion inverting lever and means for connecting the other end of said motion inverting lever to said shift rail, said motion inverting lever on said transmission being adapted to accommodate linear displacement of said motion inverting lever as well as rotary adjustment thereof about its pivot axis.

2. The combination as set forth in claim 1 wherein the means for mounting said motion inverting lever on said transmission comprises a pivot pin supported by said transmission, and an elongated opening in said motion inverting lever through which said pin extends, the position of said pin within said opening being adjusted upon rotary movement of said gearshift lever about the axis of said shaft whereby linear motion is imparted to said shift rail.

3. The combination as set forth in claim 1 wherein the means for connecting said shaft and said motion inverting lever includes an intermediate arm connected at one end to said shaft and a universal connection between the other end of said intermediate arm and said motion inverting lever, the means for connecting the other end of said motion inverting lever and said shift rail including a second intermediate arm and a universal connection between said second intermediate arm and said other end of said motion inverting lever.

4. The combination as set forth in claim 2 wherein the means for connecting said shaft and said motion inverting lever includes an intermediate arm connected at one end to said shaft and a universal connection between the other end of said intermediate arm and said motion inverting lever, the means for connecting the other end of said motion inverting lever and said shift rail including a second intermediate arm and the universal connection between said second intermediate arm and said other end of said motion inverting lever.

5. In an automotive vehicle having a steering wheel column in a vehicle housing compartment, a gearshift linkage mechanism for imparting a compound motion to a shift rail and a manually-controlled multiple-ratio power transmission mechanism, said shift rail being adapted to move linearly in the direction of its axis during engagement and disengagement of torque delivery elements of said transmission and being adapted to be rotated about its axis during gear ratio selection, a gearshift lever, a motion transmitting shaft mounted on said column in parallel disposition therewith, said shaft being connected to one end of said lever, said shaft being mounted for reciprocation in the direction of its axis and for rotation about its axis, a motion inverting lever, means for mounting said motion inverting lever pivotally on said transmission, means for pivotally connecting said shaft to one end of said motion inverting lever and means for connecting the other end of said motion inverting lever to said shift rail, the means for pivotally mounting said motion inverting lever on said transmission being adapted to accommodate linear displacement of said motion inverting lever as well as rotary adjustment thereof about its pivot axis.

6. The combination as set forth in claim 5 wherein the means for mounting said motion inverting lever on said transmission comprises a pivot pin supported by said transmission, and an elongated opening in said motion inverting lever through which said pin extends, the position of said pin within said opening being adjusted upon rotary movement of said gearshift lever about the axis of said shaft whereby linear motion is imparted to said shift rail.

7. The combination as set forth in claim 5 wherein the means for connecting said shaft and said motion inverting lever includes an intermediate arm connected at one end to said shaft and a universal connection between the other end of said intermediate arm and said motion inverting lever, the means for connecting the other end of said motion inverting lever and said shift rail including a second intermediate arm and a universal connection between said second intermediate arm and said other end of said motion inverting lever.

8. The combination as set forth in claim 6 wherein the means for connecting said shaft and said motion inverting lever includes an intermediate arm connected at one end to said shaft and a universal connection between the other end of said intermediate arm and said motion inverting lever, the means for connecting the other end of said motion inverting lever and said shift rail including a second intermediate arm and the universal connection between said second intermediate arm and said other end of said motion inverting lever.

References Cited
UNITED STATES PATENTS

| | | | |
|---|---|---|---|
| 2,517,871 | 8/1950 | Gustafson | 74—473 R |
| 2,762,236 | 9/1956 | Adloff | 74—473 X |

MILTON KAUFMAN, Primary Examiner

U.S. Cl. X.R.

74—473 R